UNITED STATES PATENT OFFICE.

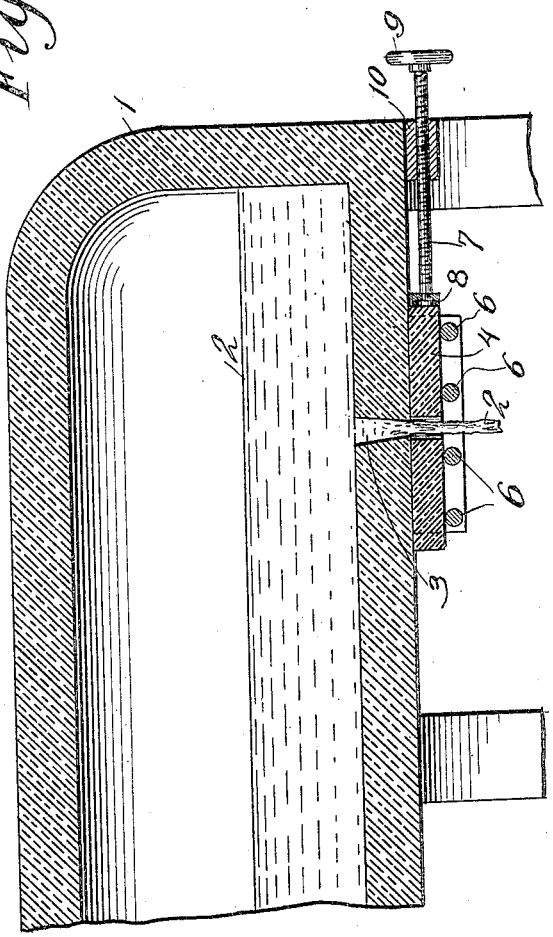

HENRY M. BROOKFIELD, OF NEW YORK, N. Y.

GLASS-FURNACE.

No. 808,810.     Specification of Letters Patent.     Patented Jan. 2, 1906.

Application filed March 3, 1902. Serial No. 96,363.

*To all whom it may concern:*

Be it known that I, HENRY M. BROOKFIELD, a citizen of the United States, and a resident of the city, county, and State of New York, have invented certain new and useful Improvements in Glass-Furnaces, of which the following is a specification.

My invention relates to glass-furnaces.

It has for its object to improve the means for discharging molten glass from a furnace, to simplify such means and to render them more efficient, and to make the discharge of the molten glass more direct and positive; also, to improve the quality of the molten glass discharged from the furnace; also, to improve the valves for controlling such discharge to make them more delicate and accurate in their control of the discharge, and also to render them more durable in use.

It consists of the novel devices and combinations herein shown and described.

In the drawings accompanying this specification and forming part hereof I have shown a portion of a glass-furnace with my improved devices in their preferred form connected therewith.

Referring to the embodiment of my invention shown in the drawings, Figure 1 is a vertical longitudinal section through a part of a glass-furnace embodying my improvement, and Fig. 2 is an under view of the valve-plate and its connecting parts.

Referring to the specific embodiment shown in the drawings, 1 represents a glass-furnace, a part only of which is shown in the drawings, and 2 represents the molten glass therein. For the purpose of discharging the molten glass from the furnace I provide a discharge-orifice which passes directly through the bottom of the furnace. As shown, 3 represents such an orifice and is preferably made tapering toward its lower end. Any suitable valve may be provided for opening and closing the orifice and for controlling the discharge of the molten glass therefrom. I prefer to use a valve of the form shown in the drawings. As there shown, it consists of a plate 4, provided with an opening 5 for registering in whole or in part with orifice 3 when it is desired to discharge the glass from the furnace. Plate 4 is movable backward and forward to cause the opening 5 to register with orifice 3 in whole or in part or to bring the solid part of the plate against orifice 3 to stop the outflow of glass. As shown and preferably, plate 4 rolls upon rollers 6. Any suitable means may be employed for imparting movement to the plate; but I prefer to use for this purpose screw-threaded means consisting of a screw-threaded rod 7, secured to the forward end of plate 4 and provided with a rounded head 8, adapted to freely turn in a similar-shaped recess in plate 4, as shown in Fig. 1, and also provided with a hand-wheel 9. Rod 7 passes through a block 10, secured to the framework of the furnace, which block is provided with interior screw-threads. By these means valve 4 can be moved forward and backward and can be operated to delicately and accurately adjust the outflow of molten glass from the furnace or to stop it altogether. Plate 4 is made so that either the part forward or the part back of opening 5 may be used as a valve portion to close orifice 3. By this arrangement the valve is made much more durable, having a large surface which can be used for the above purpose. The effect of the intensely-hot molten glass upon the face of any valve is very destructive and soon wears away the surface of such valve, destroying its usefulness. For these reasons my improved valve is very durable.

Heretofore it has been found very difficult and generally impossible to feed molten glass in a stream either from a furnace or in any other way by reason of the rapid chilling of the molten glass when it is brought into contact with surfaces not sufficiently heated. I have found that by discharging molten glass directly through the bottom of the furnace such objections are overcome, the flow is made direct and positive, and the means employed are simple and efficient. Moreover, the quality of the glass is improved, as none of the impurities near the surface of the molten glass are permitted to escape. Before starting to discharge molten glass from the furnace it is well to preliminarily heat plate 4 and the surrounding parts by any suitable means—as, for example, by means of an oil-jet. After the glass has begun to flow continuously through orifice 3 they will keep the surrounding parts sufficiently heated.

Modifications may of course be made in and departures taken from the form of device shown in the drawings without departing from my invention, the essentials of which are set forth in the claims appended hereto.

What I claim as new, and desire to secure by Letters Patent, is—

1. A furnace for molten glass provided with a discharge-orifice passing directly through the bottom of the furnace, a valve for said orifice consisting of a plate provided with an opening and provided with solid parts on both sides of the opening adapted to close the orifice, rollers located below the valve-plate upon which the latter is adapted to move, and means for moving the valve-plate, whereby molten glass may be discharged directly from the interior of the furnace and whereby the valve is made durable.

2. A furnace for molten glass provided with a discharge-orifice passing directly through the bottom of the furnace, a valve for said orifice consisting of a plate provided with an opening and provided with solid parts on both sides of the opening adapted to close the orifice, rollers located below the valve-plate upon which the latter is adapted to move, and means for moving the valve-plate, consisting of a screw-threaded rod secured to the valve-plate so as to be free to rotate and provided with a hand-wheel and a support for said rod through which the same passes interiorly screw-threaded, whereby molten glass may be discharged directly from the interior of the furnace in accurately-graduated amounts, and the valve for controlling the same will be made durable.

In testimony whereof I have signed my name to this specification in the presence of two subscribing witnesses.

HENRY M. BROOKFIELD.

Witnesses:
JOHN O. GUNPLER,
EDWIN SEGER.